United States Patent [19]

Leyarovski et al.

[11] 3,854,913

[45] Dec. 17, 1974

[54] RECOVERY OF NEON AND HELIUM FROM AIR BY ADSORPTION AND CLOSED CYCLE HELIUM REFRIGERATION

[75] Inventors: Evgueni Iliev Leyarovski; Borislav Vassilev Nicolov; Yordan Krestev Gueorguiev, all of Sofia, Bulgaria

[73] Assignee: Physicheski Institute s Aneb pri Ban, Sofia, Bulgaria

[22] Filed: Jan. 27, 1972

[21] Appl. No.: 221,265

[30] Foreign Application Priority Data
Feb. 25, 1971 Bulgaria............................ 1600171

[52] U.S. Cl.............................. 62/12, 62/18, 62/40
[51] Int. Cl................................................ F25j 5/00
[58] Field of Search.......... 62/9, 11, 12, 18, 23, 22, 62/40; 55/66

[56] References Cited
UNITED STATES PATENTS

| 3,517,521 | 6/1970 | Emerson | 62/12 |
|---|---|---|---|
| 3,609,984 | 10/1971 | Garwin | 62/22 |
| 2,458,894 | 1/1949 | Collins | 62/40 |
| 2,909,903 | 10/1959 | Zimmerman | 62/40 |
| 3,057,167 | 10/1962 | Yendall | 62/22 |
| 3,415,069 | 12/1968 | Hauser | 62/40 |
| 3,616,602 | 11/1971 | Hays | 62/18 |

OTHER PUBLICATIONS

A Method for Obtaining of Neon & Helium from Air on a Commercial Scale, Cryogenics, Feb. 1970, pp. 48–52.

*Primary Examiner*—Norman Yudkoff
*Assistant Examiner*—Frank Sever
*Attorney, Agent, or Firm*—Karl F. Ross; Herbert Dubno

[57] ABSTRACT

A method and installation for the separation of neon and helium mixtures in which the neon is condensed from the mixture at a temperature below 25°K, the uncondensed neon is adsorbed from the mixture at a temperature between 22°K and the critical-point temperature of helium, and a helium-cooling cycle is used to abstract heat from the mixture.

2 Claims, 1 Drawing Figure

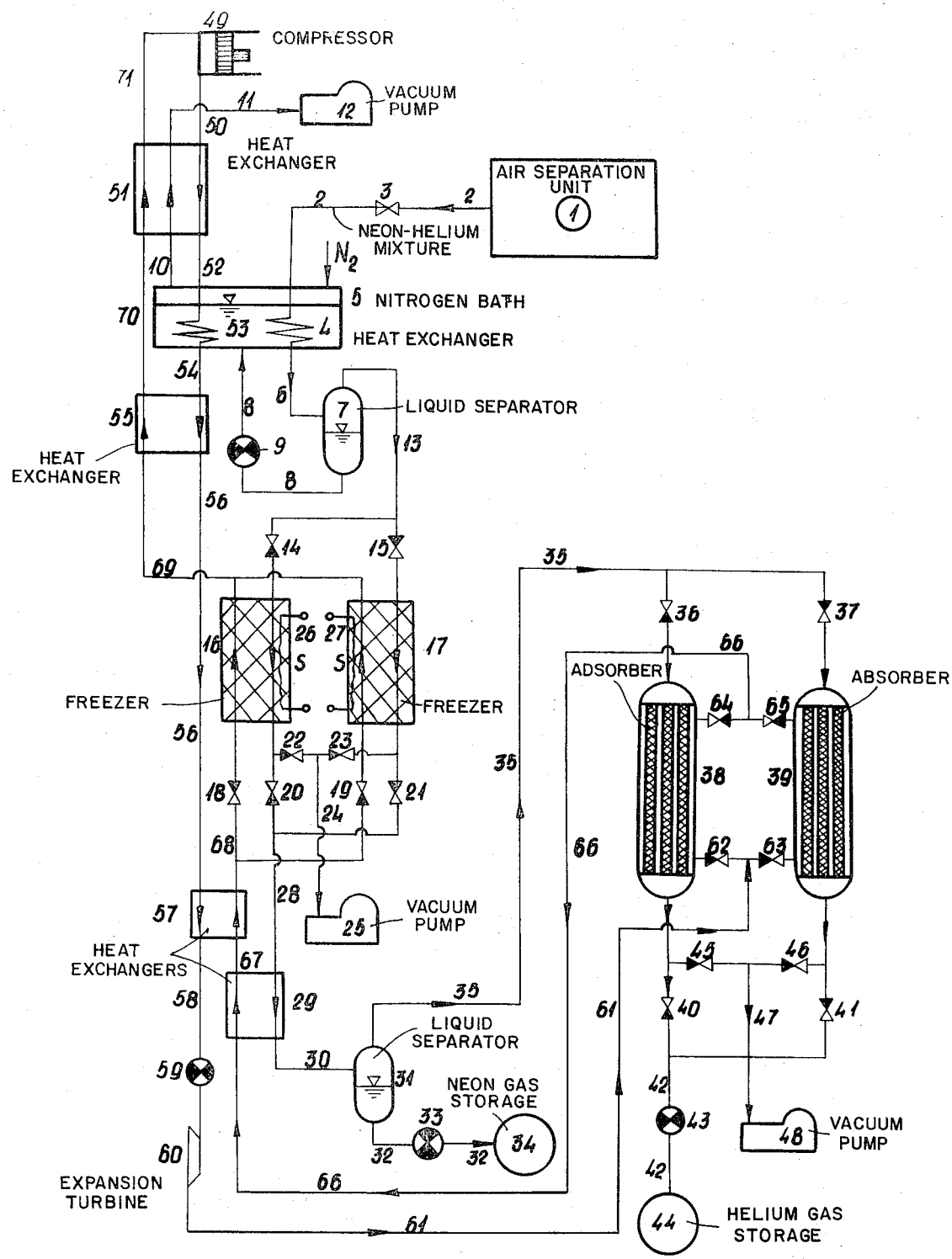

RECOVERY OF NEON AND HELIUM FROM AIR BY ADSORPTION AND CLOSED CYCLE HELIUM REFRIGERATION

FIELD OF THE INVENTION

The invention relates to a method of and installation for purification (rectification) and separation of a neon-helium mixture enabling production of pure neon and helium from the waste gases of factories for hydrogen production and gas processing.

BACKGROUND OF THE INVENTION

In all branches of the gas-processing industry, in which large quantities of air are processed or used, in particular those which operate in a closed cycle, there exist conditions for accumulating of non-condensing or non-reacting mixtures rich in inert and difficult-to-liquefy gases, i.e. neon and helium. These mixtures are discharged into the atmosphere periodically or continuously. Because of the high outputs of modern gas-processing installations, the production of neon and helium from these mixtures can be regarded as profitable and efficient from an industrial point of view.

There were two main principles by means of which such a mixture, after having been freed from the high-boiling components like nitrogen, argon and methane, can be separated into its components. Briefly they can be outlined as follows:

The first principle makes use of the selectivity of the adsorption of the components as to temperature, pressure or adsorbent;

The second method is based on the difference in the boiling-points of the components.

The adsorption method for separation of a neon-helium mixture produced during separation of air, is carried out at nitrogen temperatures. Due to the comparatively low degree of adsorption of the neon under these conditions, the installation must be constructed with large dimensions and therefore is unsuitable for cooling and operation. The diffusive character and the low speed of adsorption make this method largely inconvenient for processing, on an industrial scale, large quantities of mixtures which are essentially richer in helium. These are, for example, the waste gases of gas-processing factories, using air as raw material.

The condensation methods are only suitable from the point of view of the thermodynamics; they provide for much higher efficiency; the necessary equipment is much more compact, less sophisticated and easier to handle, offering on the other hand a practically unlimited capacity of the installation as compared to the capacity of the adsorption installation.

However, both of the main types of methods, using the principle of condensation, have significant disadvantages:

In the methods used in the USSR and the USA, the neon is solidified by means of solid hydrogen, sublimating under vacuum. The limit of purification of the helium in the helium-neon mixture or in other words the limit of the extraction factor (removal) of the neon is determined by the temperature, which can be reached by pumping out of solid hydrogen under conditions of acceptable heat exchange (14°K). It corresponds to purification of helium in the range of 98%.

The method, developed in East Germany, by means of which the neon in the neon-helium mixture is liquified under increased pressure (up to 25 atm.) with the help of an auxiliary cooling cycle, using liquefied neon, allows the production of only one part of the neon with the necessary high degree of purification. The thus-produced helium, which in conformity with the phase equilibrium of the mixture at 27°K and under 25 atm. contains 10 – 12 % neon, is obviously fit for nothing.

Other disadvantages of both of the methods include:

The operation with liquefied hydrogen is dangerous; the pumping out of the vapors of the solidified hydrogen requires special, sophisticated and expensive vacuum equipment. The heat exchange between the crystals of the hydrogen and a solid wall, i.e. the tubes of the freezer, is quite problematic, and the pressure of the hydrogen vapor at 12°K is about 10 mm Hg; consequently there arises the need for considerable heat exchange surface area.

The extraction (removal) of the neon when condensing it by means of liquefied neon, boiling at normal pressure, is not complete, particularly when separating mixtures, which are essentially richer in helium than the air mixture; the compression of the neon-helium mixture up to medium and high pressures brings about the dissolution of the helium in the liquefied neon and therefore a contamination of the neon by the helium. Where the first portions of vapors, which are rich in helium after throttling, are discarded, the loss of neon increases in accordance with the equilibrium of the mixture liquid-gas at 27°K and 1 atm.

Neither of the methods allows production of helium having sufficiently high degree of purification. Therefore contamination of the helium by the neon makes it unsuitable for the liquefaction, which is its major application at present. When separating mixtures received from the gas-processing factories however, the helium may prove to be the main product.

OBJECTS OF THE INVENTION

The purpose of the invention is to enable the separation of the neon-helium mixtures in a wide range of concentrations and with the production of pure neon and helium; in addition, it is an object of the invention to provide a safe and continuous industrial process for the described purpose, offering a high factor of extraction of both of the gases.

SUMMARY OF THE INVENTION

The present invention involves successive condensation at the triple point of the neon and adsorption of the neon at temperatures below its triple point maintained by a helium cooling cycle provided with an expansion turbine, and desorption of the neon, thereby eliminating the disadvantages of the existing methods. The main advantages of the method are as follows:

1. The operation with helium is safe compared to that with hydrogen.

2. The cooling by means of helium is effected under conditions of compulsory convection and the heat exchange problems with solid hydrogen do not arise.

3. At the outlet of the expansion turbine it is possible to maintain stable low temperatures to 5.2°K, which offers two advantages simultaneously:

a. the possibility of obtaining necessary temperature differentials permitting small dimensions for the heat exchange surface of the neon condenser and also permitting heat exchange in counterflow and actual dephlegmation of the neon in the initial mixture at the lowest temperatures and the least concentrations, thereby increasing sharply the factor of extraction (removal) of the neon as compared with its condensation under isothermal conditions in a neon or hydrogen bath; and b. the possibility of operating at low pressures of the original mixture, say between 1 atm. and the pressure with which the mixture emerges from the gas processing or the oxygen producing unit.

Relating to the absolute losses of neon, it must be brought out that it is the partial pressure of the neon in the mixture that matters, the partial pressure being defined by the temperature but not by the total pressure; the decrease in the temperature results in an increase of the factor of extraction (removal) of the neon.

The dissolution of the helium in the liquefied neon is proportional to its partial pressure in the mixture; the discharge of large portions of neon together with the dissolved helium, which is considered to be the major source of loss in the German method, is significant in processing mixtures which are rich in helium, whose partial pressure is high at the beginning of the process. Upon decreasing the pressure depending on the initial concentration of the neon in the gas mixture, the content of helium in the liquid may be brought up to the standard level at which the condenser-dephlegmator will produce neon of standard purity directly.

4. The placing of an adsorber behind the dephlegmator enables the direct production of helium, having a high degree of purity, by means of its fine purification from the neon which accompanies it at a concentration corresponding to phase equilibrium in the condenser. When using normal adsorbents, eliminating the molecular sieves, the mutual adsorption of the helium to the neon is insignificant and consequently the factor of extraction of the helium exceeds 95%.

5. Under the conditions of adsorption mentioned above, together with the neon contaminating the helium, there is adsorbed all of the hydrogen contained in the mixture. The hydrogen remains practically undissolved in the liquefied neon due to the low pressures of the method. Therefore the present method also solves the so-called "hydrogen problem" in the separation of neon-helium mixtures.

6. The possibility of obtaining at the outlet of the expansion turbine various low temperatures allows the adsorber to operate at temperatures lower than the temperatures of the condenser. It is well known, that the adsorption reduces abruptly the temperature of crystallization. In addition, the adsorber is able to operate without depending on the condenser.

7. The desorption of the neon by pumping out the adsorber without raising the temperature prevents an effect upon the helium cooling cycle from the latent heat of adsorption and from the physical heat of the adsorber and the adsorbent during their periodical cooling down to the working temperature; the use of the helium cooling cycle allows the adsorber to be isolated from the condenser, so that during its desorption cooling, the temperature of the adsorber falls under the working temperature whereby the efficiency of the next adsorption increases sharply.

8. The regeneration of the adsorber under vacuum and at extremely low temperature provides for a compact and easy-for-handling device, which requires cooling only once, i.e. upon starting up the installation initially.

9. The use of an expansion turbine as a main source of cold in the helium cooling cycle makes the run of substantially unlimited duration. This cannot be achieved with a piston machine, since the most popular machines of this kind have a run in the range of eight hundred hours.

The use of the adsorption step in the process of separation of the mixture allows the helium cycle to operate at temperatures not lower than 20°K, which makes the process simple and easily feasible.

DESCRIPTION OF THE DRAWING

The sole FIGURE of the accompanying drawing is a flow diagram of an installation for carrying out the method of the invention.

EXAMPLE AND SPECIFIC DESCRIPTION

The installation comprises a unit 1, intended for separation of air, connected to the heat exchanger 4 by means of the pipeline 2 and the valve 3. The heat exchanger is connected to the separator of liquid 7 by means of the pipeline 6. The separator of liquid 7 and the nitrogen bath 5 are connected by the pipeline 8 and the throttle valve 9. The connection between the separator of the liquid 7 and the pair of freezers 16 and 17 is effected by the pipeline 13 and the valves 14 and 15; the connection between the freezers 16 and 17 and the heat exchanger 29 is effected by the pipeline 28 and the valves 20 and 21. The pumping out of the freezers 16 and 17 is carried out via the valves 22 and 23 and the pipeline 24 by means of the vacuum pump 25. The pipeline 30 connects the heat exchanger 29 to the liquid separator 31, which is connected to the gas holder 34 through the pipeline 32 and the throttle valve 33. By means of the pipeline 35 and the pair of valves 36 and 37 are connected the liquid separator 31 and the pair of adsorbers 38 and 39, which through the valves 40 and 41, the pipeline 42 and the throttle valve (flow control valve) 43, are connected to the gas holder 44. The vacuum pump 48 and the adsorbers 38 and 39 are connected through the valves 45 and 46 and the pipeline 47.

The connections to the cooling cycle are as follows: the compressor 49 is connected by the line 50 to a heat exchanger 51 and then by the line 52 to the heat exchanger 53; the cooling cycle also includes a line 54 leading to the heat exchanger 55, the pipeline 56 running to the heat exchanger 57, the pipeline 58 with the throttle valve 59 and connected to the expansion turbine 60, and the pipeline 61 whose twin inlet valves 62 and 63 are connected to adsorbers 38 and 39; the twin valves 64 and 65 connect to the pipeline 66, the heat exchanger 29, the pipeline 67, the heat exchanger 57, the pipeline 68, the twin inlet valves 18 and 19, the twin heat exchangers 16 and 17, the pipeline 69, the heat exchanger 55, the pipeline 70, the heat exchanger 51, the pipeline 71, and the compressor 49.

PRINCIPLE OF OPERATION

The neon-helium mixture, containing 90 – 95 % nitrogen and having pressure, corresponding to the operating rate of the unit intended for separation of the air, comes from the air-separation unit 1 through the valve 3 and the nitrogen heat exchanger 4, wherein the mixture is cooled by nitrogen, boiling under vacuum in the nitrogen bath 5. As a result, the greater part of the nitrogen in the mixture is liquefied and collected in the liquid separator 7. The liquefied nitrogen is subjected to throttling in the throttle valve 9 and comes into the nitrogen bath 5. The vacuum in the nitrogen bath 5 is maintained by the vacuum pump 12. Leaving the liquid separator 7 the neon-helium mixture is received by the switching-over heat exchangers 16 and 17, wherein the mixture is purified from the residual nitrogen by freezing the latter. For this purpose the mixture in the heat exchangers is cooled down to the required temperature by the heat exchange with the helium of the helium-cooling by-cycle. The switchover of the heat exchangers 16 and 17, after their congestion with the frozen nitrogen, is effected by means of the double valves 14 and 15, 18 and 19, 20 and 21. The extraction (removal) of the frozen nitrogen is effected by means of the heaters 26 and 27 and the vacuum pump 25, which evacuates through the valves 22 and 23 the nitrogen vaporized by the heaters 26 and 27. After the final purification from nitrogen, the mixture is received by the heat exchanger 29 in order to be subjected to separation. Therein it is cooled by the helium cooling cycle down to about 24°K, whereby, the larger quantity of the neon in the mixture is condensed and collected in the liquid separator 31. Therefrom after throttling in the throttle valve 33, the liquefied neon is poured into Dewar flasks or, after its vaporization, is transferred into the neon gas holder 34. The dissolution of the helium in the liquefied neon corresponds to the equilibrium in the system and to the standard of purity of the neon as well. The concentration of the helium in the neon can be reduced and practically minimized, if the vapors which are formed upon throttling the liquefied neon are taken away (removed).

After the mixture has left the liquid separator 31, it includes mainly helium and some quantity of neon and hydrogen. The latter are removed in the adsorbers 38 and 39, wherein they are cooled with helium from the cooling by-cycle; in this case the removal is effected by means of an adsorbent, which is a molecular sieve relative to the helium. As a result of the adsorption pure helium is produced, which, after throttling, is received by the helium gas holder 44. The switchover of the adsorbers is effected by the valves 36 and 37, 40 and 41, 62 and 63, 64 and 65. The regeneration of the adsorbent is effected under vacuum by means of the vacuum pump 48 and the valves 45 and 46. As a result of the desorption the adsorbent is cooled. The desorption is one of the two main sources of cold in the system. The second source of cold is the helium cooling by-cycle, using the expansion turbine 60. The helium is compressed in the compressor 49, and then subjected to cooling successively in the main heat exchanger 51, in the nitrogen heat exchanger 53, in the bath with nitrogen (which is boiling under vacuum) and in the heat exchangers 55 and 57. Further on by means of the throttle valve 59, the pressure is reduced to the required level and the gas is introduced into the expansion turbine 60, wherein the gas is expanded up to 1.3 – 1.5 atm.; simultaneously the gas is cooled down to a temperature which is located between the triple point of the neon and the critical (temperature) point of the helium. The cooled helium is then released into the adsorbers 38 and 39, into the heat exchangers 29 and 57, into the switching-over heat exchangers 16 and 17 and into the heat exchangers 55 and 51, in result of which it gets warmed up to room temperature, whereupon it is received again by the compressor in order to be compressed.

We claim:

1. A method of separating neon from helium in a neon-helium mixture and producing pure neon and helium, comprising the steps of:
   a. cooling said neon-helium mixture by heat exchange with cold helium formed in a closed helium-circulating by-cycle by expansion of helium to a temperature below substantially 25°K to condense neon from said mixture and produce a noncondensed gas consisting predominantly of helium but containing residual neon;
   b. adsorbing neon from said noncondensed gas in a molecular sieve adsorber at a temperature between 5.2°K and 22°K to remove said residual neon;
   c. desorbing neon from said adsorber under vacuum while cooling at a temperature below 22°K said gas to said temperature between 22°K and the critical temperature point of helium at least in part by abstracting from said gas all of the latent heat of desorption of the neon, said mixture prior to step (a) containing at least one high-boiling component selected from the group which consists of nitrogen and oxygen; and
   d. prior to step (a), subjecting said mixture to a low temperature sufficient to freeze said high-boiling component and remove it from said mixture.

2. The method defined in claim 1 wherein steps (a) and (b) are carried out at substantially the pressure at which said mixture is received from a source thereof.

* * * * *